Aug. 18, 1959  S. E. JACKE ET AL  2,900,038
ULTRASONIC CLEANING APPARATUS
Filed Feb. 1, 1957  5 Sheets-Sheet 3
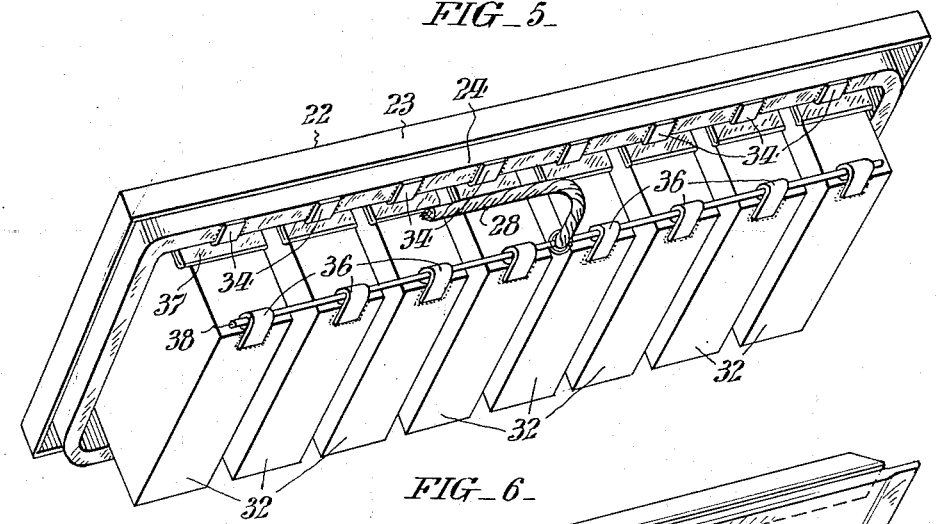
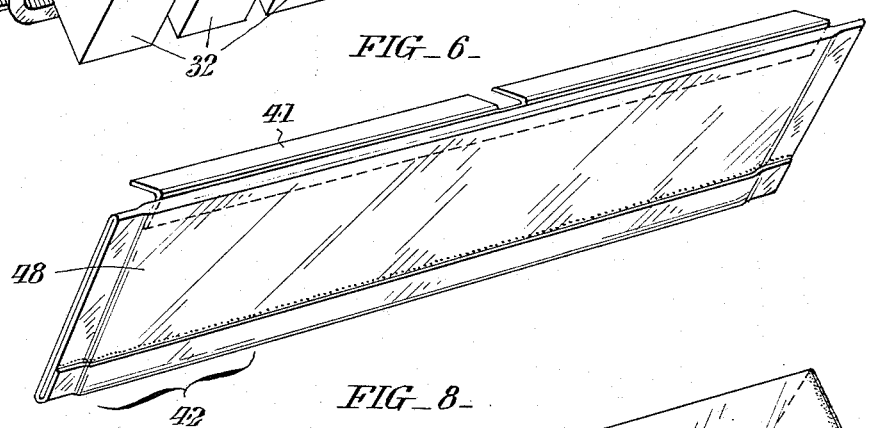
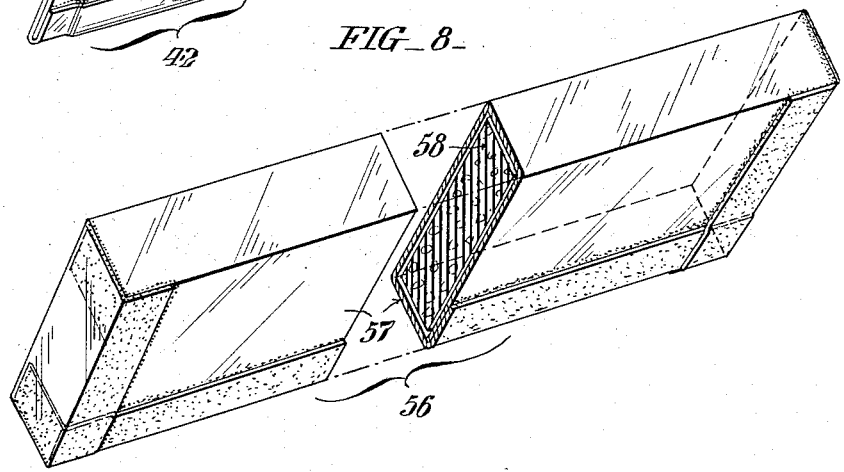
INVENTORS:
Stanley E. Jacke,
Lowell C. Newsome &
Thomas J. Kearney,
BY Paul & Paul
ATTORNEYS

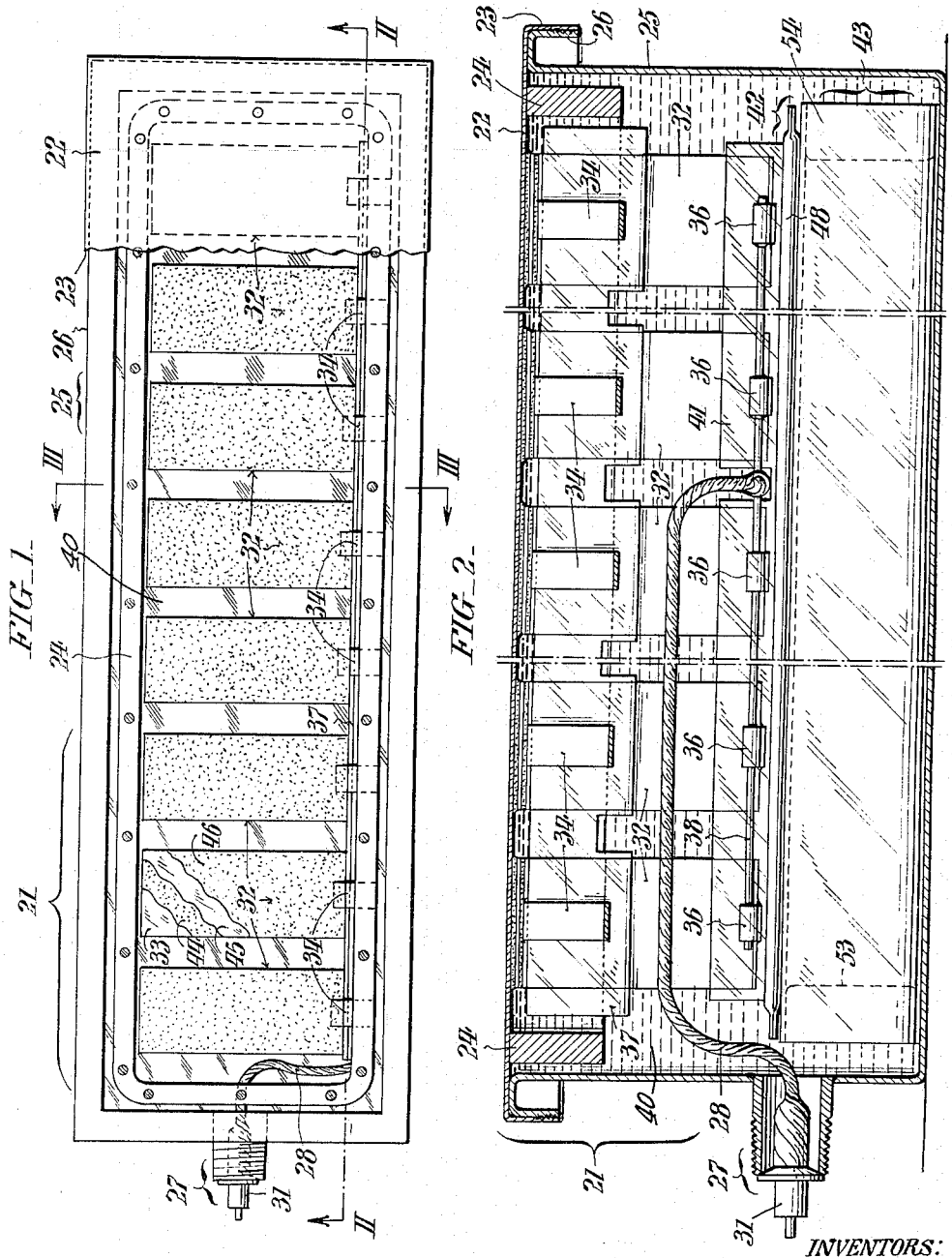

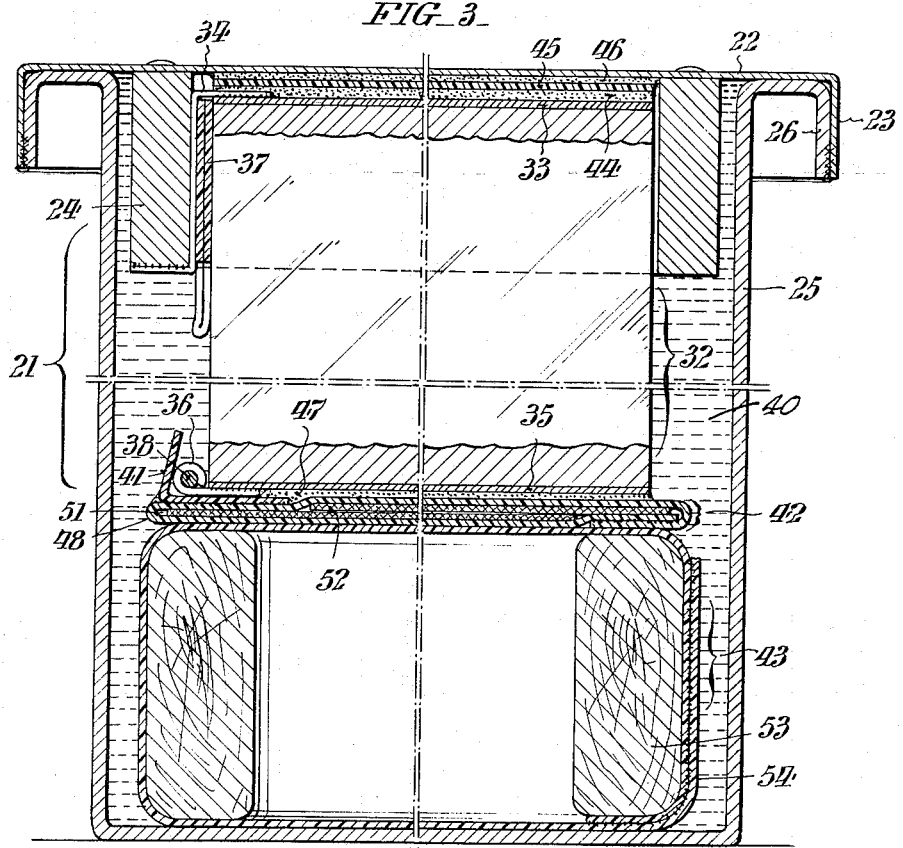
FIG_3
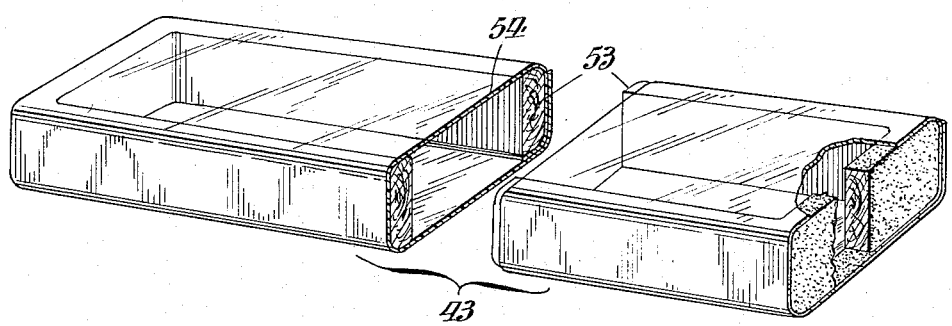
FIG_4

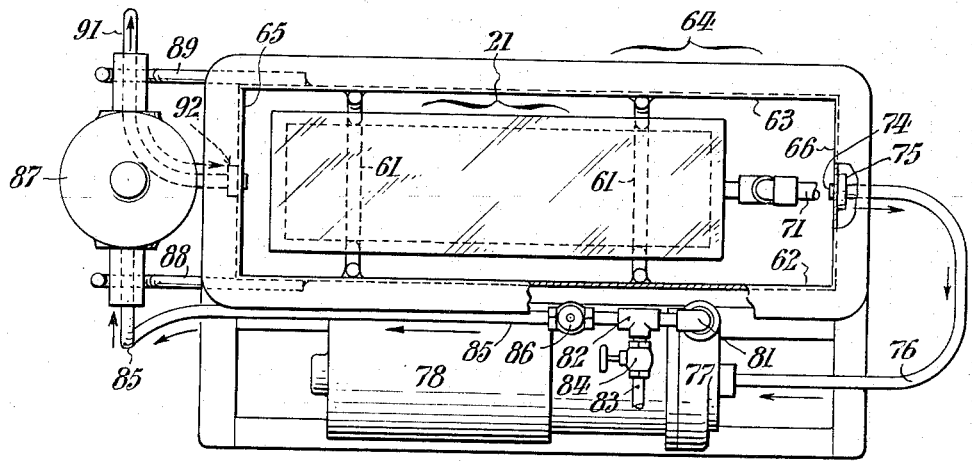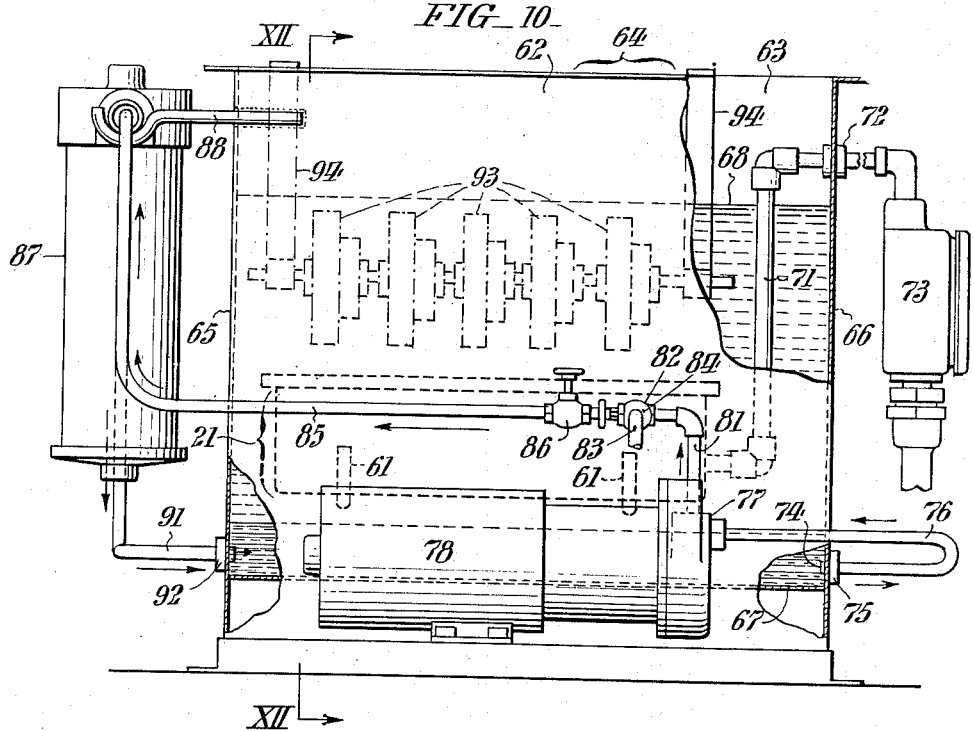

Aug. 18, 1959 S. E. JACKE ET AL 2,900,038
ULTRASONIC CLEANING APPARATUS
Filed Feb. 1, 1957 5 Sheets-Sheet 5
FIG_11_
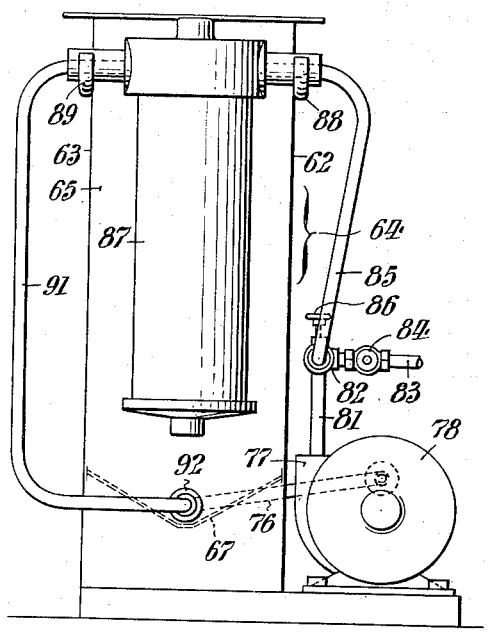
FIG_12_
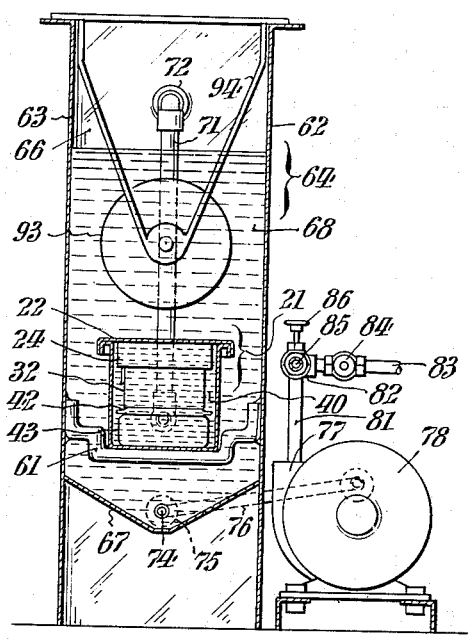
FIG_7_
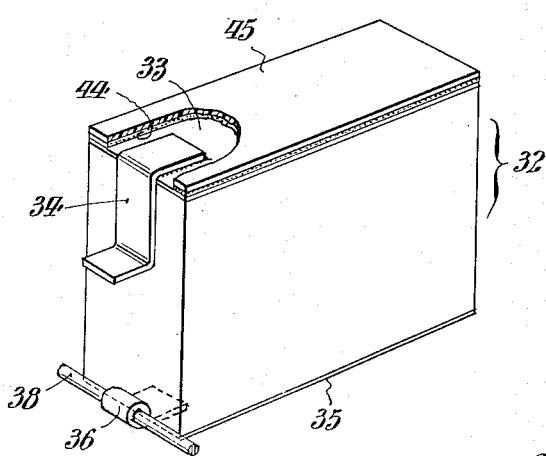
INVENTORS:
Stanley E. Jacke,
Lovell C. Newsome &
Thomas J. Kearney,
BY
Paul & Paul
ATTORNEYS

United States Patent Office 2,900,038
Patented Aug. 18, 1959

2,900,038

ULTRASONIC CLEANING APPARATUS

Stanley E. Jacke, Walled Lake, Lowell C. Newsome, Inkster, and Thomas J. Kearney, Detroit, Mich., assignors to Detrex Chemical Industries, Inc., Detroit, Mich., a corporation of Michigan Application February 1, 1957, Serial No. 637,808

9 Claims. (Cl. 181—.5)

This invention relates to apparatus for cleaning a work object, and more particularly concerns ultrasonic apparatus for removing grease and soil from a work object submerged in a cleaning fluid.

It is an object of this invention to provide apparatus for generating ultrasonic waves in a cleaning fluid, which apparatus has increased power and better concentrations of ultrasonic energy in the cleaning fluid than has been heretofore obtained. It is another object to provide such apparatus which is highly resistant to attack by acids and to erosion from cavitation. Another object of this invention is to direct the ultrasonic waves in a predetermined path and to oppose the dissipation of ultrasonic energy in any other path. It is another object to control the temperature range of the apparatus and thus control changes in its electrical characteristics, thereby minimizing adjustments to the source of electrical power. Another object is to control the pressure to which the apparatus is subjected. It is another object of this invention to provide apparatus which is protected from thermal shock and which combines flexibility with strength.

Other objects and advantages of the invention will further become apparent hereinafter, and in the drawings whereof:

Fig. 1 represents a plan view of apparatus constructed in accordance with this invention, with parts broken away in order to illustrate important details;

Fig. 2 represents a fractured enlarged longitudinal vertical section of the apparatus shown in Fig. 1, taken as indicated by the lines and arrows II—II which appear in Fig. 1;

Fig. 3 represents a still more enlarged and fractured cross sectional view taken as indicated by the lines and arrows III—III which appear in Fig. 1;

Fig. 4 represents a view in perspective of the compression chamber constituting one element of the apparatus shown in Fig. 3, with parts broken away in order to illustrate important details;

Fig. 5 represents a view in perspective of the lid portion of the apparatus;

Fig. 6 represents a view in perspective of the reflector of the apparatus;

Fig. 7 represents a view in perspective, with parts broken away, of a transducer element of the apparatus;

Fig. 8 represents a view in perspective of a modified form of expansion chamber of the apparatus;

Fig. 9 represents a plan view of apparatus constructed in accordance with this invention including a tank and a fluid circulating system;

Fig. 10 represents a view in elevation of the apparatus of Fig. 9;

Fig. 11 represents a left end view of the apparatus of Fig. 9; and

Fig. 12 represents a view in cross section taken as indicated by the lines and arrows XII—XII which appear in Fig. 10.

Although specific terms are used in the following description for clarity, these terms are intended to refer only to the structures shown in the drawings, and are not intended to define or limit the scope of the invention.

Turning now to the specific embodiment of the invention selected for illustration in the drawings, the number 21 designates generally a transducer housing with a lid 22 having a lip 23 and a reinforcing frame 24 and having a body member 25 with a U shaped flange 26. Lid 22 is welded to body member 25 along lip 23 and flange 26 to provide a hermetical seal. Body member 25 is also provided with a hermetically sealed coupling 27 through which is passed an electrical conductor 28 having an electrical connector 31. Body member 25 is preferably made of 18 gauge stainless steel, lid 22 is preferably made of .020 inch stainless steel, and reinforcing frame 24 is preferably made of stainless bar stock welded into a rectangle and then spot-welded onto lid 22.

Attached to the inner surface of lid 22 are a series of barium titanate transducers 32 which are rectangular in shape and which are spaced apart from one another for a reason hereinafter to be explained. These transducers 32 are all polarized in the direction perpendicular to the surface of the lid and have ends of like polarity attached to the lid so that they are in phase, i.e. so that they all expand together and contract together. The top of transducer 32 has a silver coating 33 (Fig. 3) which has soldered thereto a top tab 34. Similarly, the bottom of transducer 32 has a silver coating 35 to which is soldered a bottom tab 36. Tabs 34 and 36 are preferably made of brass. A strip of plastic film 37 is disposed between top tab 34 and the end of transducer 32.

The end of bottom tab 36 is wrapped around a wire 38 and soldered thereto. Wire 38 is connected to conductor 28 and a strip 41 of protective film is positioned between bottom tabs 36 and the inner wall of housing 21.

Below transducers 32 and affixed to the bottom thereof is a reflector 42 (see also Fig. 6), and positioned between reflector 42 and the bottom of body member 25 is a compression chamber 43 (Fig. 4). A cooling liquid 40 (see Fig. 12), such as perchlorethylene, is provided that fills housing 21.

Referring to Fig. 3, transducer 32 is provided with a layer of glue 44 on top of its silver coating 33 which joins it to a barrier strip 45 preferably of plastic. Strip 45 is fastened by a layer of glue 46 to the underside of lid 22 which has been roughened to hold the glue better.

Top tab 34 besides having one end soldered to the silver coating 33 of transducer 32, has its other end soldered to the undersurface of reinforcing frame 24. At the bottom of transducer 32 a layer of glue 47 joins silver coating 35 to reflector 42. Also glued to reflector 42 is protective strip 41.

Reflector 42, comprising a hermetically sealed envelope 48, which is preferably made of a polyethylene terephthalate polyester film encases an air film 51 and a piece of tissue paper 52 which aids in the creation of air film 51. The edges of envelope 48 are folded over each other and are made leak proof by use of a heated hand iron and benzyl alcohol which welds the polyethylene terephthalate polyester film to itself. These edges are further sealed through the application of an epoxy resin adhesive which is used to seal the edges after the application of heat.

As is shown in Figs. 3 and 4, compression chamber 43 is formed from a light balsa wood ring 53 covered by an envelope 54 of said polyester film which is glued to itself and to the balsa wood. Glue is also spread over the open ends of the balsa wood ring 53 to form a sealed, air filled compression chamber. Balsa wood does not provide a good support because of its poor resistance to compressive force, and the compression chamber 43 does not support the heavy barium titanate transducers 32. Transducers 32 are suspended from lid 22.

Fig. 5 shows a view in perspective of lid 22, reinforcing frame 24 and transducers 32 and includes top tabs 34, bottom tabs 36, plastic film 37 (which separates top tabs 34 and transducers 32), wire 38 and conductor 28. Fig. 6 shows a view in perspective of reflector 42 with protective strip 41 glued thereto; and Fig. 7 shows a perspective view of a single transducer with portions of its top layers broken away in order to illustrate more clearly their disposition.

Fig. 8 shows a modified form of an expansion chamber 56 which is provided with a hermetically sealed envelope 57 encompassing a compressible foam insert 58 which is preferably made of foam plastic.

Referring to Figs. 9 through 12, the transducer housing 21 is mounted on support rods 61 which are welded to the side walls 62 and 63 of a well 64. Well 64 is also provided with end walls 65, 66 and with a sloping bottom 67. Transducer housing 21 is submerged in a cleaning fluid 68 that is contained within well 64.

Leading from housing 21 is stainless steel conduit 71 which is passed through end wall 66 through a fitting 72 to a connection box 73 (Fig. 10) where electrical connection is made with a conductor extending from the source of power (not shown). If desired, conduit 71 is passed over end wall 66, instead of through it, so that the entire transducer assembly may be removed readily from the well.

Near the bottom of well 64 is positioned an outlet port 74, an outlet fitting 75 and an outlet conduit 76 which is connected to a pump 77 that is driven by a motor 78. Pump outlet conduit 81 is connected to a T connection 82 which has a conduit 83, having a valve 84, leading therefrom. Also extending from T connection 82 is a conduit 85 having a valve 86. Conduit 85 is connected to the top of a filter 87 which is supported from side walls 62 and 63 of well 64 by brackets 88, 89. Extending from the top of filter 87 is a conduit 91 which is connected to an inlet coupling 92 located in end wall 65 and positioned about an inlet port.

In operation, the work objects 93 suspended from hangers 94 are submerged in cleaning fluid 68 within well 64 (Figs. 10, 12) and are subjected to the ultrasonic waves produced in the well. Cleaning fluid 68 is kept clean through the action of the cleaning fluid circulatory system which withdraws the cleaning fluid from the well 64 through outlet port 74, passes it through conduit 76, pump 77, conduits 81 and 85, filter 87, and conduit 91, and returns it to the well through an inlet port defined by inlet coupling 92.

In transducer housing 21, the transducers 32 are energized by the electrical connections and vibrate in unison in a direction perpendicular to the plane of lid 22 to create ultrasonic waves in cleaning fluid 68 that pass upwardly from lid 22. The ultrasonic energy is prevented from being dissipated in the direction away from lid 22 by the action of reflector 42. The spacing of the transducers serve to cancel out any ultrasonic energy emitted in a sidewise direction from the transducers 32.

The cooling liquid 40 (Fig. 12) cools the entire assembly within housing 21. When the temperature of liquid 40 rises, the liquid expands and causes chamber 43 to compress.

As can be seen from the foregoing, providing the barium titanate transducers with a cooling liquid results in a number of advantages. For example, more power can be applied to the transducer housing to give better concentrations of ultrasonic energy in the cleaning fluid. Further, there is less change in the electrical characteristics of the elements since there is less change in the temperature of the transducers. This is very convenient from the standpoint of making generator adjustments, since it minimizes the adjustment necessary.

Welding the lid and the body of the housing together is of advantage since it protects the apparatus from chemical attack by the cleaning fluid and from erosion due to cavitation.

Loss of ultrasonic energy through or from the back surface of the transducers into the cooling liquid is prevented by the air reflector. Any energy lost into the cooling liquid naturally would detract from the energy coming off of the front surface of the transducers.

Another feature of this invention is the spacing of the transducers at a distance from each other equal to one half wave length. It has been found that the small amount of ultrasonic energy which is coupled to the width mode of the transducer can be cancelled out with this spacing. This results in a further saving of the energy supplied to the transducer. Additionally, the spacing between the transducers exposes a greater surface area of the transducers to the cooling liquid, which results in more rapid and efficient cooling.

The compression chamber allows for the expansion of the cooling liquid as the apparatus reaches higher temperatures in operation. Perchlorethylene is preferred as the cooling liquid since it does not effect the epoxy resin adhesive, has a boiling point above the boiling point of water and also is fluid enough to set up convection currents for efficient cooling. When the cooling liquid expands, the compression chamber collapses, keeping the pressure within housing 21 below a level which can destroy the assembly.

A piece of plastic is interposed between each transducer and the stainless steel lid to protect the transducers from thermal shock. This plastic forms a barrier which prevents the transducer from coming into direct contact with the stainless steel lid. The plastic is cemented in this position so that the transducer has a uniform heat barrier between it and the lid. The transducer is made of barium titanate, and as such is highly susceptible to heat shock and will crack under sudden changes in temperature. These plastic strips serve to protect the transducers from such accidents.

The cement used to fasten the transducer and the plastic strips to the lid is an epoxy resin adhesive. This material has tremendous adhesive strength and can be cured at temperatures below the Curie point of the barium titanate. Furthermore, the epoxy resin is impervious to chlorinated hydrocarbons used as the cooling liquid and is excellent for the transmission of sound energy, especially since it is 100% solids with no solvent release.

Providing the lid with its reinforcing frame is of importance, since it leaves the lid of sufficient thinness to provide for efficient vibration and at the same time gives the lid the strength necessary to support properly the transducers which are of considerable weight.

It is to be understood that the form of the invention herewith shown and described is to be taken as a preferred embodiment. Various changes may be made in the shape, size and arrangement of parts. For example, the transducer elements may be round bars instead of rectangular in shape, equivalent elements may be substituted for those illustrated and described herein, parts may be reversed, and certain features of the invention may be utilized independently of the use of other features, all without departing from the spirit or scope of the invention as defined in the subjoined claims.

Having thus described our invention, we claim:

1. A transducer unit comprising a hermetically sealed housing, said housing including an emitting plate, transducer means mounted within said housing for generating ultrasonic energy in a predetermined direction, said transducer means including a piezoelectric transducer attached to and suspended from the emitting plate, a gas-filled sealed compression chamber comprising an envelope formed of a resilient impervious film surrounding a compressible material, said compression chamber being contained within said housing, reflector means interposed between said transducer means and said compression chamber, and a cooling liquid contained within the housing in contact with the transducer means.

2. A transducer unit comprising a hermetically sealed housing, transducer means mounted within said housing for generating ultrasonic energy in a predetermined direction, a cooling liquid contained within said housing in contact with said transducer means, a gas-filled sealed compression chamber comprising an envelope formed of a resilient impervious film surrounding a compressible material, said chamber contained within said housing and providing for expansion of the cooling liquid within the housing, and reflector means interposed between said transducer means and said compression chamber.

3. A transducer unit comprising a hermetically sealed housing, transducer means mounted within said housing for generating ultrasonic energy in a predetermined direction, a cooling liquid contained within the housing in contact with substantially the entire exposed surface of the transducer means, a gas-filled sealed compression chamber comprising an envelope formed of a resilient impervious film surrounding a compressible material, said compression chamber being contained within said housing, and means preventing transmission of said ultrasonic energy in a predetermined direction located between said transducer means and said compression chamber.

4. The transducer unit defined in claim 3, wherein said cooling liquid is a non-polar liquid.

5. A transducer unit comprising a hermetically sealed housing, a wall of said housing having mounted thereon a plurality of piezoelectric transducers polarized for vibration in unison in a mode normal to the surface of said wall, said transducers being resonant at a predetermined frequency, said transducers being mounted substantially parallel to each other and spaced apart from each other, resilient means interposed between said transducers and said wall, a cooling liquid contained within said housing in contact with said transducers, a gas-filled compression chamber comprising an envelope formed of a resilient impervious film surrounding a compressible material, said compression chamber being positioned within said housing providing for expansion of said liquid within said housing, and means interposed between said transducer means and said compressible chamber for preventing transmission of said ultrasonic energy in the direction of said compression chamber.

6. The transducer unit defined in claim 5, wherein said predetermined frequency is approximately 45 kilocycles and wherein said resilient means and said transducers are joined to said wall by an epoxy resin adhesive.

7. The transducer unit defined in claim 6, wherein is provided a reinforcing frame mounted on said wall and positioned about said transducers.

8. A transducer unit comprising a hermetically sealed housing, transducer means including a barium titanate transducer having a front surface mounted on an inner surface of the lid of said housing for generating ultrasonic energy in a predetermined direction, a cooling liquid contained within said housing in contact with said transducer means, a gas-filled sealed compression chamber formed by a stiffener member completely surrounded by a hermetically sealed resilient envelope, said compression chamber being contained within said housing, and means interposed between said transducer means and said compression chamber for preventing transmission of said ultrasonic energy from the back surface of said transducer means.

9. A transducer unit comprising a hermetically sealed housing, transducer means mounted within said housing for generating ultrasonic energy in a predetermined direction, a cooling liquid contained within said housing in contact with said transducer means, a gas-filled sealed compression chamber comprising a foam plastic inner member completely surrounded by a hermetically sealed resilient envelope formed of polyethylene terephthalate polyester film which is sealed with an epoxy resin adhesive, said compression chamber being contained within said housing, and reflector means interposed between said transducer means and said compression chamber.

References Cited in the file of this patent

UNITED STATES PATENTS

| | | |
|---|---|---|
| 2,086,891 | Bachmann et al. | July 13, 1937 |
| 2,468,538 | Benioff | Apr. 26, 1949 |
| 2,585,103 | Fitzgerald | Feb. 12, 1952 |
| 2,605,346 | Gogolick et al. | July 29, 1952 |
| 2,616,820 | Bourgeaux | Nov. 4, 1952 |
| 2,702,260 | Massa | Feb. 15, 1955 |
| 2,760,181 | Camp | Aug. 21, 1956 |
| 2,770,741 | Vore et al. | Nov. 13, 1956 |

FOREIGN PATENTS

| | | |
|---|---|---|
| 548,960 | Great Britain | Oct. 30, 1942 |